United States Patent
Gerber et al.

(10) Patent No.: US 7,062,223 B2
(45) Date of Patent: Jun. 13, 2006

(54) MOBILE TRANSCEIVER AND ELECTRONIC MODULE FOR CONTROLLING THE TRANSCEIVER

(75) Inventors: Louis Gerber, Bern (CH); Stefan Gysin, Bern (CH)

(73) Assignee: Phonak Communications AG, Courgevaux (CH)

( * ) Notice: Subject to any disclaimer, the term of this patent is extended or adjusted under 35 U.S.C. 154(b) by 479 days.

(21) Appl. No.: 10/391,219

(22) Filed: Mar. 18, 2003

(65) Prior Publication Data

US 2004/0185773 A1  Sep. 23, 2004

(51) Int. Cl.
*H04H 7/00* (2006.01)

(52) U.S. Cl. ............... 455/3.06; 455/41.2; 455/41.3; 455/11.1

(58) Field of Classification Search ........... 455/3.06, 455/221, 309, 312, 500, 526, 88, 132, 414.1, 455/517, 550.1, 556.1, 102, 103, 507, 41.2, 455/41.3, 11.1; 348/706, 825.51; 370/395.42, 370/444
See application file for complete search history.

(56) References Cited

U.S. PATENT DOCUMENTS

| | | | |
|---|---|---|---|
| 5,915,210 A * | 6/1999 | Cameron et al. ............ 455/59 |
| 5,930,729 A * | 7/1999 | Khamis et al. ............. 455/571 |
| 6,236,832 B1 * | 5/2001 | Ito ............................ 455/3.06 |
| 6,424,820 B1 * | 7/2002 | Burdick et al. ............ 455/41.1 |
| 2002/0172379 A1 * | 11/2002 | Cliff ........................... 381/119 |
| 2003/0103577 A1 * | 6/2003 | Harada et al. .............. 375/295 |
| 2003/0198280 A1 * | 10/2003 | Wang et al. ................ 375/132 |
| 2004/0204074 A1 * | 10/2004 | Desai ........................ 455/557 |

* cited by examiner

*Primary Examiner*—Edan Orgad
*Assistant Examiner*—Dominic E. Rego
(74) *Attorney, Agent, or Firm*—Pearne & Gordon LLP

(57) ABSTRACT

A mobile transceiver (1) comprises several receivers (16a, 16b, 16c, 17, 18, 19) for receiving electrical or electromagnetic signals carrying audio signals and a radio transmitter (15) for transmitting radio signals carrying audio signals. The mobile transceiver (1) comprises a prioritizing module (101) for assigning priority values to audio signals received by the receivers (16a, 16b, 16c, 17, 18, 19). The prioritizing module (101) is designed to assign priority values in accordance with priority values assigned to the receivers (16a, 16b, 16c, 17, 18, 19) that received the audio signal concerned and/or to signal identifiers contained in the received electrical or electromagnetic signals carrying the audio signal concerned. The mobile transceiver (1) makes it possible to receive several audio signals separately from different audio sources, to prioritize automatically the received audio signals, and to select automatically and transmit one of the several received audio signals to the user, thereby assisting the possibly hearing impaired user in differentiating audio signals from different audio sources.

22 Claims, 2 Drawing Sheets

MOBILE TRANSCEIVER AND ELECTRONIC MODULE FOR CONTROLLING THE TRANSCEIVER

BACKGROUND OF THE INVENTION

The present invention relates to a mobile transceiver and to an electronic module controlling the transceiver. Specifically, the present invention relates to a mobile transceiver and to an electronic module controlling the transceiver, the mobile transceiver comprising a receiver for receiving electrical or electromagnetic signals, the electrical or electromagnetic signals carrying audio signals, and a radio transmitter for transmitting radio signals carrying audio signals.

Transceivers with a receiver for electrical signals carrying audio signals and with a radio transmitter for transmitting radio signals carrying audio signals are known for the wireless transfer of acoustic information between separate locations. Such known transceivers have a connector for connecting a microphone to the receiver of the transceiver. The electrical signal carrying the audio signal received from the connected microphone is forwarded to the radio transmitter of the transceiver. The radio transmitter in the known transceivers transmits a radio signal carrying the received audio signal to a separate radio receiver in a remote location. The known transceivers are installed, for example, in public places for transferring acoustic information from speeches or presentations from the speaker to hearing aids of hearing impaired people in the audience. Similarly, mobile versions of the known transceivers are used in the entertainment industry for transferring the speaking or singing voice from a performer to an amplification system or to transmit spoken instructions to a headphone of a performer on stage or in a recording studio. Mobile transceivers are also known in the form of headsets for hands-free use of mobile radio phones. The known mobile transceivers are typically limited, however, to specific applications rendering them not very useful for the hearing impaired who are exposed daily to a multitude of different acoustic information from various audio sources. The known mobile transceivers cannot be used in connection with different types of audio sources. Moreover, the known mobile transceivers do not assist their users in differentiating audio signals from different audio sources. Particularly, hearing impaired people get drowned in acoustic information from numerous audio sources, without being able to make out individual audio sources or to differentiate acoustic information from different audio sources. Consequently, the ringing of a telephone, or worse a fire alarm, might get missed because of audio signals from a television or stereo set.

SUMMARY OF THE INVENTION

It is an object of this invention to provide a mobile transceiver, comprising a receiver for receiving electrical or electromagnetic signals carrying audio signals and a radio transmitter for transmitting radio signals carrying audio signals, and an electronic module controlling the mobile transceiver, which do not have the disadvantages of the prior art. In particular, it is an object of the present invention to provide a mobile transceiver and an electronic module controlling the transceiver which can be used with audio signals from different types of audio sources and which make it possible for users to differentiate audio signals from different audio sources.

According to the present invention, these objects are achieved particularly through the features of the independent claims. In addition, further advantageous embodiments follow from the dependent claims and the description.

According to the present invention, the above-mentioned objects are particularly achieved in that the mobile transceiver comprises several receivers for receiving electrical or electromagnetic signals carrying audio signals, in that the mobile transceiver comprises a prioritizing module for assigning priority values to audio signals received by the receivers, and in that the mobile transceiver comprises a relay module for forwarding the received audio signal having the highest assigned priority value to a radio transmitter of the mobile transceiver for transmission by radio signals. Having several receivers, for receiving electrical or electromagnetic signals carrying audio signals, makes it possible for the mobile transceiver to receive several audio signals separately and concurrently from different audio sources. Assigning different priority values to the separately and concurrently received audio signals and selectively forwarding the received audio signal having the highest assigned priority to the radio transmitter makes it possible for the mobile transceiver to selectively transmit received audio signals to the user. By transmitting only selected received audio signals to the user, the mobile transceiver assists the user in differentiating audio signals from different audio sources. Essentially, high priority audio signals important to the user are detected by the mobile transceiver and transmitted to the user, while audio signals less important to the user are filtered by the mobile transceiver.

The radio transmitter is preferably a low power radio transmitter with a transmitting power in the range of 0.1 milliwatts to 100 milliwatts, suitable for transmitting the selected audio signal over a distance of a few meters to hearing aids or headphones, for example. The receivers for receiving electrical signals comprise different types of connectors for connecting different types of external audio sources to the mobile transceiver. The receivers for receiving electromagnetic signals are designed to receive electromagnetic signals in the radio and/or infrared frequency range for wireless reception of audio signals from different types of external audio sources.

In a preferred embodiment the prioritizing module is designed to assign a priority value to a received audio signal in accordance with a priority value assigned to the receiver that received that audio signal. Assigning priority values in correspondence with the receiver that received that audio signal is particularly advantageous when receivers are assigned fixed to a specific audio source, such as a telephone, a door bell or an alarm.

In an embodiment the prioritizing module is designed to assign a priority value to a received audio signal in accordance with a priority value assigned to a signal identifier contained in that received audio signal or in accordance with a priority value assigned to a signal identifier contained in the received electrical or electromagnetic signal that carried that received audio signal. Assigning priority values in correspondence with signal identifiers contained in the received signal makes it possible to differentiate audio signals received by the same receiver in addition to differentiating audio signals received by different receivers. On the other hand, differentiating received audio signals at the signal level requires audio sources providing such signal identifiers.

In an embodiment the mobile transceiver comprises an interface for assigning priority values to the receivers and/or to signal identifiers. Such an interface makes it possible for the user to customize the configuration of the priorities to his personal needs, his environment and circumstances. In this way the user can easily customize the selective transmission of received audio signals to the user. Furthermore, the user can spontaneously select an audio signal currently being received to have the highest assigned priority.

In an embodiment the mobile transceiver comprises several stored sets of priority values, each set comprising different assignments of priority values to the receivers and/or to signal identifiers, and the mobile transceiver comprises an interface for activating one of the sets. Storing and activating such sets of stored priority values makes it possible for the user to switch efficiently between different defined priority configurations adapted, for example, to specific locations or time periods having their particular scenario of audio sources or activities, respectively. In this way the user can efficiently change between defined configurations for the priority based selection of received audio signals to be transmitted to the user.

In an embodiment the mobile transceiver comprises positioning means for determining the current geographic position and the prioritizing module is designed to assign a priority value to a received audio signal in accordance with the determined current geographic position. Determining the current geographic position and assigning priority values in accordance with the determined current geographic position has the advantage that the selection of received audio signals to be transmitted to the user can automatically be adapted to the current location of the user.

In an embodiment the mobile transceiver comprises time determination means for determining the current time, and the prioritizing module is designed to assign a priority value to a received audio signal in accordance with the determined current time. Determining the current time and assigning priority values in accordance with the determined current time has the advantage that the selection of received audio signals to be transmitted to the user can be adapted automatically to the current time.

In an embodiment the mobile transceiver comprises a log module for recording historical priority values assigned to the receivers or to signal identifiers, and the prioritizing module is designed to assign a priority value to a received audio signal in accordance with the recorded historical priority value assigned to the receiver that received that audio signal, or assigned to the signal identifier contained in the received electrical or electromagnetic signal that carried that received audio signal. Recording the history of assigning priority values and assigning priority values to received audio signals in accordance with the recorded historical assignment of priority values has the advantage that the mobile transceiver can automatically adapt to preferred priority configurations set by the user, for example preferred configurations in specific locations or at specific times.

In an embodiment the mobile transceiver comprises a microphone, the prioritizing module is designed for assigning priority values to audio signals received by the microphone, and the relay module is designed for forwarding audio signals received by the microphone to the radio transmitter for transmission by radio signals when the audio signal received by the microphone has the highest assigned priority value. Having a microphone integrated in the mobile transceiver has the advantage that audio signals from audio sources such as people or loudspeakers present near the mobile transceiver can be received in the mobile transceiver and transmitted to the user without the need for additional cables or equipment.

Preferably, the radio transmitter is designed to transmit radio signals in a frequency range different from the frequency range of the electromagnetic signals received by the receivers. Using different frequency ranges for transmitting and receiving radio signals avoids problems of interference between received and transmitted signals.

In an embodiment the radio transmitter is designed to transmit radio signals in a form different from the form of the electromagnetic signals received by the receivers. Using different signal forms for transmitting and receiving radio signals avoids problems of interference between received and transmitted signals.

In an embodiment the mobile transceiver comprises a buffer for buffering a received audio signal having a higher assigned priority than the audio signal currently being forwarded to the radio transmitter, and the relay module is designed to fade out the volume of the audio signal currently being forwarded to the radio transmitter, before forwarding the buffered audio signal to the radio transmitter. Buffering received audio signals subsequently to be forwarded to the user and fading out audio signals currently forwarded to the user has the advantage that a change of the audio signal or the audio source, respectively, can be indicated to the user through a pause between the two audio signals without any of the subsequent audio signals being lost.

In an embodiment at least some of the receivers are coupled with a corresponding additional transmitter for bidirectional exchange of audio signals. This has the advantage that the mobile transceiver can be coupled with audio sources supporting bidirectional communication such as mobile or fixed telephones or intercoms.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

In the following description the term audio signal refers to acoustic signals audible to humans, typically in the range of 100 Hz to 8 KHz or, in the case of high fidelity electronic devices, in the extended range of 20 Hz to 20 KHz.

Figure 1:
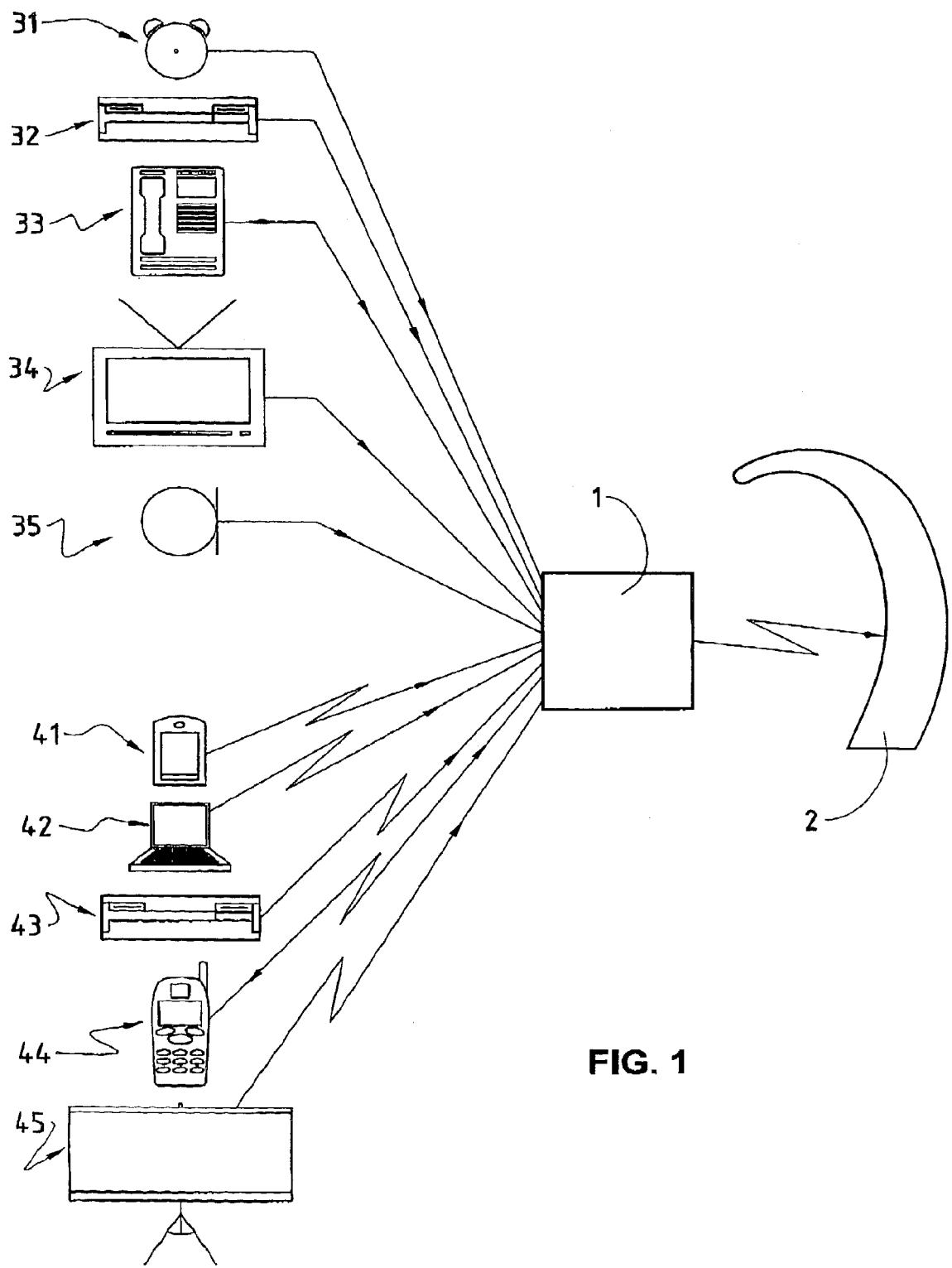
FIG. 1 shows a block diagram illustrating the signal flow between several audio sources and a mobile transceiver and from the mobile transceiver to a radio receiver, the audio sources being connected to the mobile transceiver through a wired link or a wireless link.

In FIG. 1, the reference numeral 1 refers to a mobile transceiver which will be described later in more detail with reference to FIG. 2. The mobile transceiver 1 is designed such that it can be carried easily by its user and, depending on the situation, the user may place the mobile receiver 1 on a platform away from himself or carry the mobile receiver 1 on him, for example. Obviously, the mobile receiver 1 can also be installed permanently in, or connected permanently to, a fixed or mobile electronic device.

In FIG. 1, the reference numerals 31, 32, 33, 34, 35 refer to examples of different audio sources which are connected to the mobile transceiver 1 by means of wired links. The reference numeral 31 refers to an audio source generating acoustic alarm signals, such as a fire alarm or the ringing of a door bell. The reference numeral 32 refers to an audio source such as a stereo set delivering audio signals received via radio or cable broadcast or read from storage media such as CD (Compact Disc), DVD (Digital Versatile Disk), hard disk, magnetic tape or the like. The reference numeral 33 refers to an audio source represented by a fixed telephone or an intercom apparatus. The reference numeral 34 refers to an audio source delivering audio signals from television programs received via radio or cable broadcast or from multimedia data read from storage media such as DVD, hard disk, magnetic tape or the like. The reference numeral 35 refers to an audio source represented by a microphone. The wired audio sources 31, 32, 33, 34, 35 produce electrical signals that carry the respective audio signals to the mobile transceiver 1, as indicated by the arrows in FIG. 1. The audio signals can be carried as analogue or digital signals. As is illustrated by the double arrow, the wired link between the mobile transceiver 1 and the audio source 33 is suited for bidirectional exchange of electrical signals.

In FIG. 1, the reference numerals 41, 42, 43, 44, 45 refer to examples of different audio sources which are connected to the mobile transceiver 1 by means of wireless links. For establishing the wireless links, the audio sources 41, 42, 43, 44, 45 are provided with transmitters for transmitting electromagnetic signals, preferably in the radio or infrared frequency range. The reference numeral 41 refers to an audio source represented by a hand held computer transmitting audio signals from stored data files such as MP3 (MPEG, Moving Pictures Expert Group) files. The reference numeral 42 refers to an audio source represented by a laptop computer transmitting audio signals from stored data files such as MP3 files or data files of other formats read from hard disk, CD or DVD. The reference numeral 43 refers to an audio source transmitting audio signals read from storage media such as CD or DVD. The reference numeral 44 refers to an audio source represented by a mobile radio telephone transmitting audio signals received over a mobile radio network. The reference numeral 45 refers to an audio source set up in a public area transmitting audio signals provided by a microphone or a recording. The wired audio sources 31, 32, 33, 34, 35 transmit electromagnetic signals that carry the respective audio signals to the mobile transceiver 1, as indicated by the arrows in FIG. 1. The audio signals can be carried as analogue or digital signals. As is illustrated by the double arrow, the wired link between the mobile transceiver 1 and the audio source 44 is suited for bidirectional exchange of electromagnetic signals.

The audio sources 31, 32, 33, 34, 35, 41, 42, 53, 44, 45 illustrated in FIG. 1 are given as examples only and are not meant to be restrictive. Moreover, the illustrated examples of wired audio sources 31, 32, 33, 34, 35 can also be provided with electromagnetic transmitters or, vice versa, the illustrated examples of audio sources 41, 42, 53, 44, 45 provided with electromagnetic transmitters can be connected to the mobile transceiver 1 by means of wired links instead.

In FIG. 1 the reference numeral 2 refers to a radio receiver coupled with an electro-acoustic converter, preferably a hearing aid with a radio receiver for receiving radio signals carrying audio signals or a headphone with such a receiver.

Figure 2:
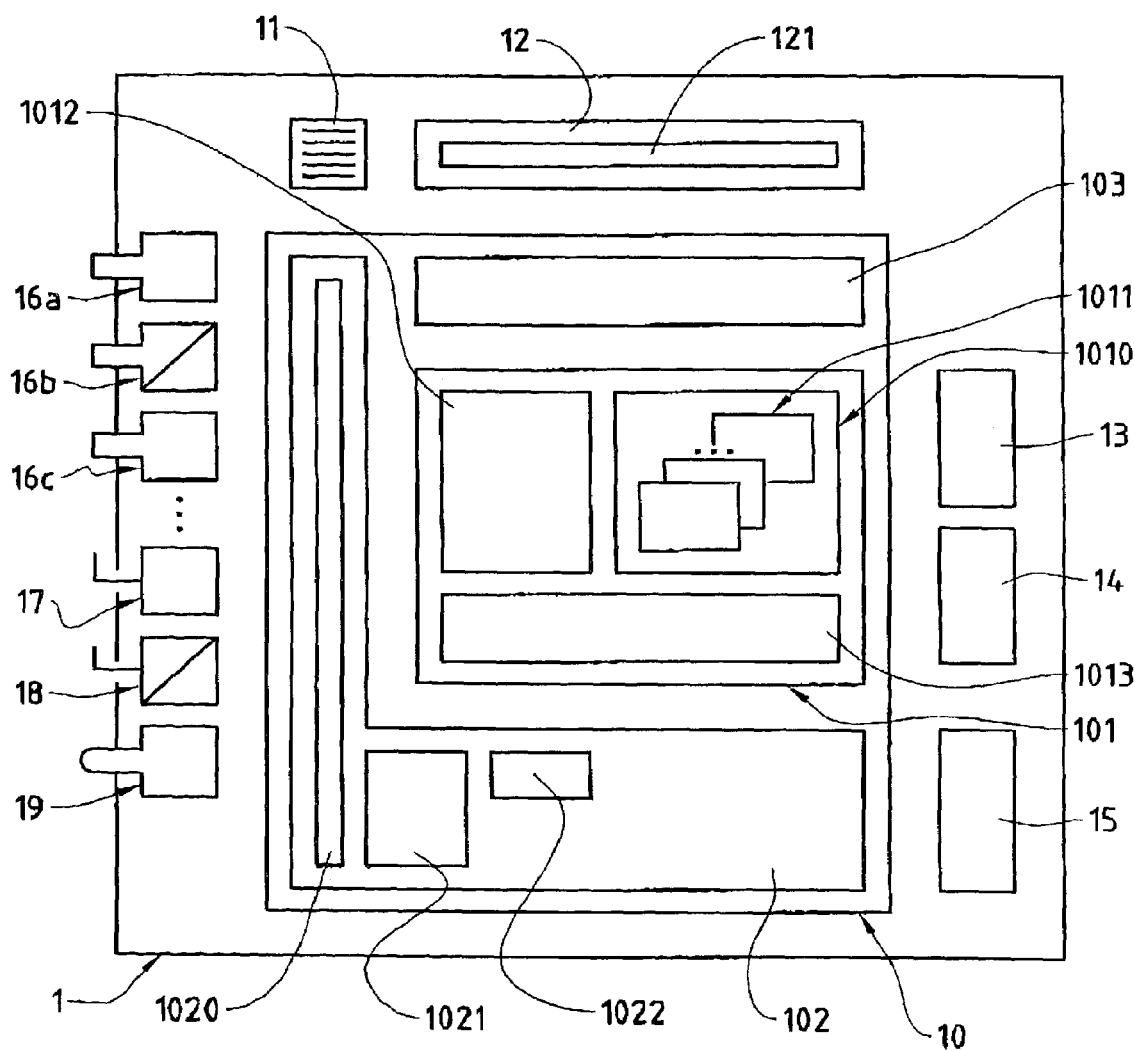
FIG. 2 shows a block diagram illustrating a mobile transceiver comprising several receivers, a radio transmitter and an electronic module with a prioritizing module and a relay module.

As is illustrated in FIG. 2, the mobile transceiver 1 is provided with several conventional receivers 16a, 16b, 16c for receiving the electrical signals carrying the audio signals from the wired audio sources 31, 32, 33, 34, 35 described above. The receivers 16a, 16b, 16c comprise connectors for removably connecting the wired audio sources 31, 32, 33, 34, 35 to the mobile transceiver 1. As is schematically illustrated in FIG. 2, receiver 16b is provided for bidirectional exchange of electrical signals, for example for connecting the audio source 35. Furthermore, the mobile transceiver 1 is provided with several conventional receivers 17, 18, 19 for receiving the electromagnetic signals carrying the audio signals from the audio sources 41, 42, 43, 44, 45 described above. For example, receiver 17 is provided for receiving radio signals, receiver 18 is provided for bidirectional exchange of radio signals, and receiver 19 is provided for receiving infrared signals.

Optionally, the mobile transceiver 1 comprises a built-in microphone 11 for receiving acoustic signals from audio sources, particularly from human speakers, near the mobile transceiver 1.

In FIG. 2, the reference numeral 12 refers to operating elements such as buttons or dials which make it possible for the user of the mobile receiver 1 to enter data and control signals or to adjust the volume, i.e. the gain of the radio transmitter 15, respectively, The operating elements 12 may also include a display 121 for displaying operational status, parameter settings or other information to the user.

Optionally, the mobile transceiver 1 is provided with positioning means 13 for determining the current geographic position, for example a GPS receiver (Global Positioning System).

Optionally, the mobile transceiver 1 is provided with time determination means 14 for determining the current time, for example an integrated clock or a receiver for time information such as a GPS receiver.

As is illustrated in FIG. 2, the mobile transceiver 1 comprises a radio transmitter 15. The radio transmitter is a unidirectional low power radio transmitter with a transmitting power in the range of 0.1 milliwatts to 100 milliwatts, sufficient for a covering a distance of approximately 10 to 100 meters. Preferably, the radio transmitter 15 transmit radio signals in a frequency range different from the frequency ranges of the electromagnetic signals received by the receivers 41, 42, 43, 44, 45 and/or in a form different from the form of the electromagnetic signals received by the receivers 41, 42, 43, 44, 45.

The mobile transceiver 1 comprises an electronic module 10 preferably integrated as an integrated circuit. The electronic module 10 can also be built from several separate electronic components. The electronic module 10 comprises several functional modules which can be implemented by means of non-programmable logic circuits, by means of programmable logic circuits or by means of a combination of a processor and program code.

The electronic module 10 comprises a signal interface module 1020 connected to the receivers 16a, 16b, 16c, 17, 18, 19 and to the microphone 11, if applicable, for receiving the electrical signals that carry the audio signals received by the receivers 16a, 16b, 16c, 17, 18, 19 or the microphone 11 as electrical signals. The signal interface module 1020 can be provided for receiving the audio signals as electrical signals in analogue or digital form.

The electronic module 10 comprises an operating interface module 103 connected to the operating elements 121 for receiving data and control signals entered by a user of the mobile transceiver 1 and for displaying information to the user. The interface module 103 and the operating elements 121 represent the user interface for operating the mobile transceiver 1.

As is illustrated in FIG. 2, the electronic module 10 comprises two main functional modules: the prioritizing module 101 and the relay module 102.

The prioritizing module 101 assigns priority values to audio signals received via the signal interface module 1020 from the receivers 16a, 16b, 16c, 17, 18, 19 or the microphone 11. For that purpose, the prioritizing module 101 comprises stored priority values 1010, each priority value assigned to one of the receivers 16a, 16b, 16c, 17, 18, 19 or to the microphone 11. For example, a receiver identifier is assigned to each receiver 16a, 16b, 16c, 17, 18, 19 and to the microphone 11 and the stored priority values 1010 comprise assignments of priority values to receiver identifiers. Optionally, the stored priority values 1010 comprise priority values assigned to signal identifiers, which may be contained in electrical signals, electromagnetic signals or audio signals received from the receivers 16a, 16b, 16c, 17, 18, 19 or the microphone 11. As is schematically shown in FIG. 2, the stored priority values 1010 comprise several stored sets of priority values 1011. Each set of priority values 1011 comprises different assignments of priority values to the receivers and/or to signal identifiers. Assignments of priority values to the receivers and/or to signal identifiers can be entered by the user of the mobile transceiver 1 through the user interface represented by the operating elements 121 and the interface module 103. Through the same user interface, the user can also define, select and activate a particular one of the stored sets of priority values 1011.

The selection and activation of a particular one of the stored sets of priority values 1011 can also be done automatically by the control module 1013 of the prioritizing module 101 based on the current geographic position determined by the positioning means 13 and/or based on the current time determined by the time determination means 14. In this way different prioritizing schemes are automatically applied depending on the current geographic position of the user and/or depending on the current time.

The control module 1013 continuously checks from which ones of the receivers 16a, 16b, 16c, 17, 18, 19 or the microphone 11 an electrical signal carrying an audio signal is received via the signal interface module 1020. Depending on the embodiment, the control module 1013 also identifies any signal identifiers contained in the received electrical signal or audio signal. Based on the stored priority values 1010 or on the currently activated stored sets of priority values 1011, respectively, the control module 1013 determines which one of the audio signals currently received by the receivers 16a, 16b, 16c, 17, 18, 19 or the microphone 11 has the highest assigned priority. An identification of the currently received audio signal with the highest assigned priority value is passed to the relay module 102.

Through the user interface represented by the operating elements 121 and the interface module 103, the user can also manually select the currently received audio signal that is to be given the highest current priority at the moment. Optionally, the prioritizing module 101 comprises a log module 1012 for recording historical priority values assigned to the receivers 16a, 16b, 16c, 17, 18, 19 or to the microphone 11 or to signal identifiers by the user selecting momentary priorities. Historical priority values are preferably stored assigned to values of current geographic position determined by the positioning means 13 and/or to values of current time determined by the time determination means 14 at the moment when the audio signal was given the highest priority by the user. In that way preferred assignments of priority values based on geographic positions and/or time can be automatically established over time by the mobile transceiver 1.

The relay module 2 forwards the audio signal, currently received from the receivers 16a, 16b, 16c, 17, 18, 19 or the microphone 11 via the signal interface module 1020, having the highest assigned priority value to the radio transmitter 15 for transmission by radio signals.

Optionally, the relay module 102 comprises a buffer memory 1021 for buffering a received audio signal having a higher assigned priority than the audio signal currently being forwarded to the radio transmitter 15. The relay module 102 comprises a fader module 1022 which fades out the volume of the audio signal currently being forwarded to the radio transmitter 15 before forwarding the buffered audio signal to the radio transmitter 15.

What is claimed is:

1. Mobile transceiver comprising a receiver for receiving electrical or electromagnetic signals, the electrical or electromagnetic signals carrying audio signals, and a radio transmitter for transmitting radio signals carrying audio signals,
   wherein the mobile transceiver comprises several receivers for receiving electrical or electromagnetic signals carrying audio signals,
   wherein the mobile transceiver comprises a prioritizing module for assigning priority values to audio signals received by the several receivers, and
   wherein the mobile transceiver comprises a relay module for forwarding the received audio signal having the highest assigned priority value to the radio transmitter for transmission by radio signals.

2. Mobile transceiver according to claim 1, wherein the prioritizing module is designed to assign a priority value to a received audio signal in accordance with a priority value assigned to the receiver that received that audio signal.

3. Mobile transceiver according to claim 1, wherein the prioritizing module is designed to assign a priority value to a received audio signal in accordance with a priority value assigned to a signal identifier contained in that received audio signal or in accordance with a priority value assigned to a signal identifier contained in the received electrical or electromagnetic signal that carried that received audio signal.

4. Mobile transceiver according to claim 1, wherein it comprises an interface for assigning priority values to the several receivers and/or to signal identifiers.

5. Mobile transceiver according to claim 1, wherein it comprises several stored sets of priority values, each set comprising different assignments of priority values to the several receivers and/or to signal identifiers, and wherein the mobile transceiver comprises an interface for activating one of the sets.

6. Mobile transceiver according to claim 1, wherein it comprises positioning means for determining the current geographic position, and wherein the prioritizing module is designed to assign a priority value to a received audio signal in accordance with the determined current geographic position.

7. Mobile transceiver according to claim 1, wherein it comprises time determination means for determining the current time, and wherein the prioritizing module is designed to assign a priority value to a received audio signal in accordance with the determined current time.

8. Mobile transceiver according to claim 1, wherein it comprises a log module for recording historical priority values assigned to the several receivers or to signal identifiers, and wherein the prioritizing module is designed to assign a priority value to a received audio signal in accordance with the recorded historical priority value assigned to the receiver that received that audio signal, or assigned to the signal identifier contained in the received electrical or electromagnetic signal that carried that received audio signal.

9. Mobile transceiver according to claim 1, wherein it comprises a microphone, wherein the prioritizing module is designed for assigning priority values to audio signals received by the microphone and wherein the relay module is designed for forwarding audio signals received by the microphone to the radio transmitter for transmission by radio signals when the audio signal received by the microphone has the highest assigned priority value.

10. Mobile transceiver according to claim 1, wherein the radio transmitter is designed to transmit radio signals in a frequency range different from the frequency ranges of the electromagnetic signals received by the several receivers.

11. Mobile transceiver according to claim 1, wherein the radio transmitter is designed to transmit radio signals in a form different from the form of the electromagnetic signals received by the several receivers.

12. Mobile transceiver according to claim 1, wherein it comprises a buffer for buffering a received audio signal having a higher assigned priority than the audio signal currently being forwarded to the radio transmitter, and wherein the relay module is designed to fade out the volume of the audio signal currently being forwarded to the radio transmitter before forwarding the buffered audio signal to the radio transmitter.

13. Mobile transceiver according to claim 1, wherein the radio transmitter is a low power unidirectional radio transmitter with a transmitting power in the range of 0.1 milliwatts to 100 milliwatts, wherein the several receivers for receiving electrical signals comprise connectors for connecting external audio sources to the mobile transceiver, and wherein the several receivers for receiving electromagnetic signals are designed to receive electromagnetic signals in the radio and/or infrared frequency range for wireless reception of audio signals from external audio sources.

14. Mobile transceiver according to claim 1, wherein at least some of the several receivers are coupled with a corresponding additional transmitter for bidirectional exchange of audio signals.

15. Electronic device comprising a mobile transceiver according to one of the claims 1 to 14.

16. Electronic module for controlling a mobile transceiver according to claim 1 comprising a signal interface module for receiving electrical signals carrying audio signals from several receivers connectable to the electronic module, a prioritizing module for assigning priority values to audio signals received by the signal interface module, and a relay module for forwarding the received audio signal having the highest assigned priority value to a radio transmitter connectable to the electronic module.

17. Electronic module according to claim 16, wherein the prioritizing module is designed to assign a priority value to a received audio signal in accordance with a priority value assigned to the receiver from which the audio signal was received.

18. Electronic module according to claim 16, wherein the prioritizing module is designed to assign a priority value to a received audio signal in accordance with a priority value assigned to a signal identifier contained in that received audio signal or in accordance with a priority value assigned to a signal identifier contained in the received electrical signal that carried that received audio signal.

19. Electronic module according to claim 16, wherein it comprises an interface for assigning priority values to the several receivers and/or to signal identifiers.

20. Electronic module according to claim 16, wherein it comprises several stored sets of priority values, each set comprising different assignments of priority values to the several receivers and/or to signal identifiers, and wherein the electronic module comprises an interface for activating one of the sets.

21. Electronic module according to claim 16, wherein it comprises a log module for recording historical priority values assigned to the several receivers or to signal identifiers, and wherein the prioritizing module is designed to assign a priority value to a received audio signal in accordance with the recorded historical priority value assigned to the receiver from which that audio signal was received or assigned to the signal identifier contained in the received electrical signal that carried that received audio signal.

22. Electronic module according to claim 16, wherein it comprises a buffer for buffering a received audio signal having a higher assigned priority than the audio signal currently being forwarded to the radio transmitter, and wherein the relay module is designed to fade out the volume of the audio signal currently being forwarded to the radio transmitter before forwarding the buffered audio signal to the radio transmitter.

* * * * *